US011261975B2

(12) United States Patent
Mann, III

(10) Patent No.: US 11,261,975 B2
(45) Date of Patent: Mar. 1, 2022

(54) PRESSURE-REDUCTION DEVICES FOR FLUID SYSTEMS

(71) Applicant: FISHER CONTROLS INTERNATIONAL LLC, Marshalltown, IA (US)

(72) Inventor: Julian Adin Mann, III, Ames, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 0 days.

(21) Appl. No.: 16/870,448

(22) Filed: May 8, 2020

(65) Prior Publication Data

US 2021/0348689 A1 Nov. 11, 2021

(51) Int. Cl.
*F16K 3/02* (2006.01)
*F16K 31/60* (2006.01)

(52) U.S. Cl.
CPC ............ *F16K 3/0209* (2013.01); *F16K 3/029* (2013.01); *F16K 3/0254* (2013.01); *F16K 31/602* (2013.01)

(58) Field of Classification Search
CPC ...... F16K 3/0209; F16K 3/0254; F16K 3/029; F16K 31/602; F16K 47/06; F16K 47/02; F16K 47/04
See application file for complete search history.

(56) References Cited

U.S. PATENT DOCUMENTS

| | | | | |
|---|---|---|---|---|
| 3,485,474 A | * | 12/1969 | Baumann | F16K 47/06 251/121 |
| 3,965,936 A | * | 6/1976 | Lyon | F16K 11/0787 137/625.17 |
| 4,715,406 A | * | 12/1987 | Kress | F16K 11/0787 137/625.17 |
| 5,375,624 A | * | 12/1994 | Knapp | F16K 11/0787 137/625.17 |
| 7,063,106 B2 | * | 6/2006 | Knapp | F16K 11/0787 137/625.17 |
| 9,777,469 B2 | * | 10/2017 | Wang | F16K 3/0254 |

* cited by examiner

*Primary Examiner* — Kevin R Barss
(74) *Attorney, Agent, or Firm* — Hanley, Flight & Zimmerman, LLC

(57) ABSTRACT

Pressure-reduction devices for fluid systems are disclosed. An example device includes a housing defining an axial fluid passageway between an inlet and an outlet. A first plate is fixed to the housing and positioned in the axial fluid passageway. A second plate is positioned adjacent the first plate in the axial fluid passageway. The second plate is moveable relative to the first plate between a first position to move the pressure-reducing device to a closed position to restrict or prevent fluid flow through the axial fluid passageway and a second position to move the pressure-reducing device to an open position to allow fluid flow through the axial fluid passageway.

20 Claims, 11 Drawing Sheets

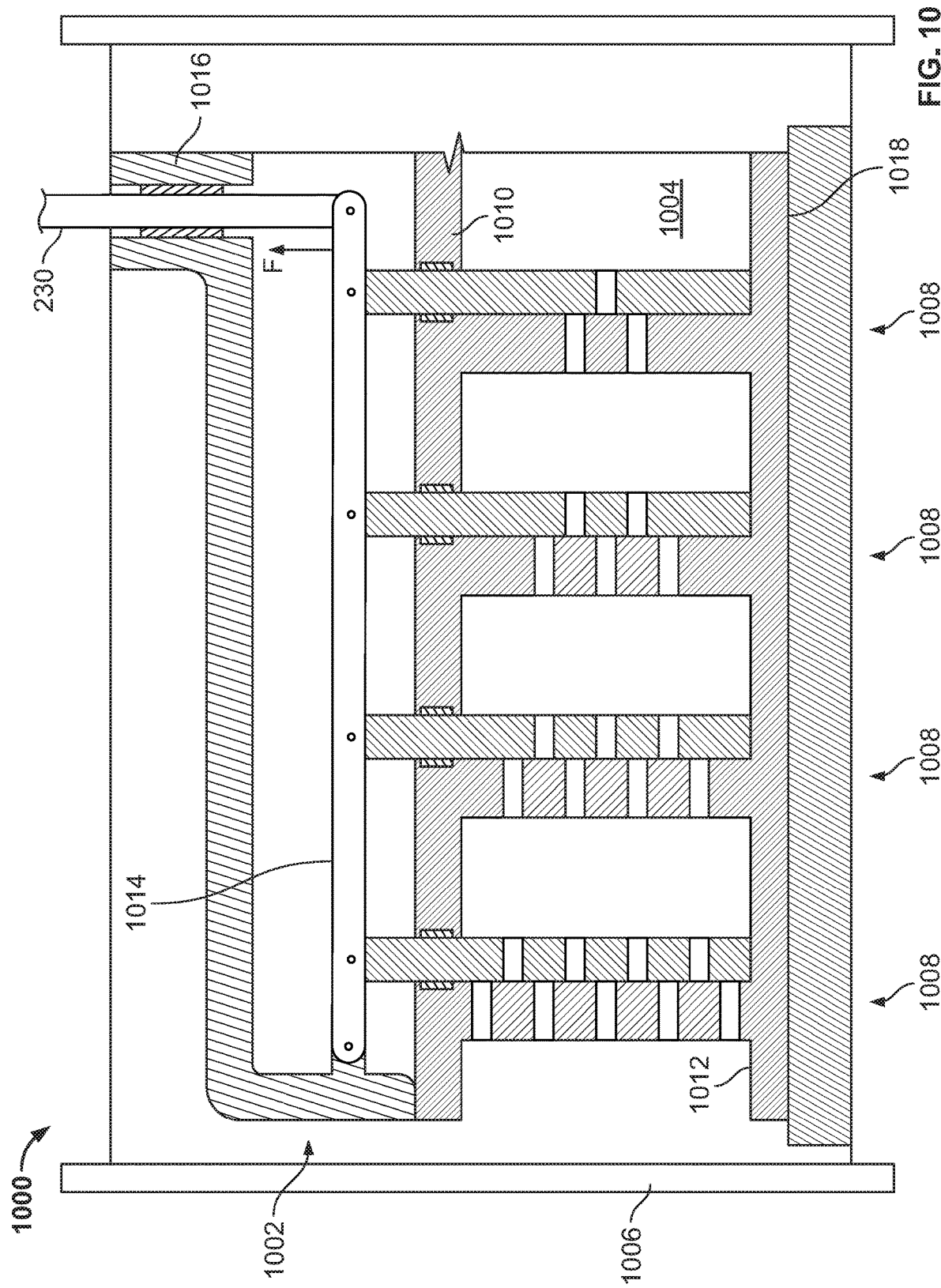

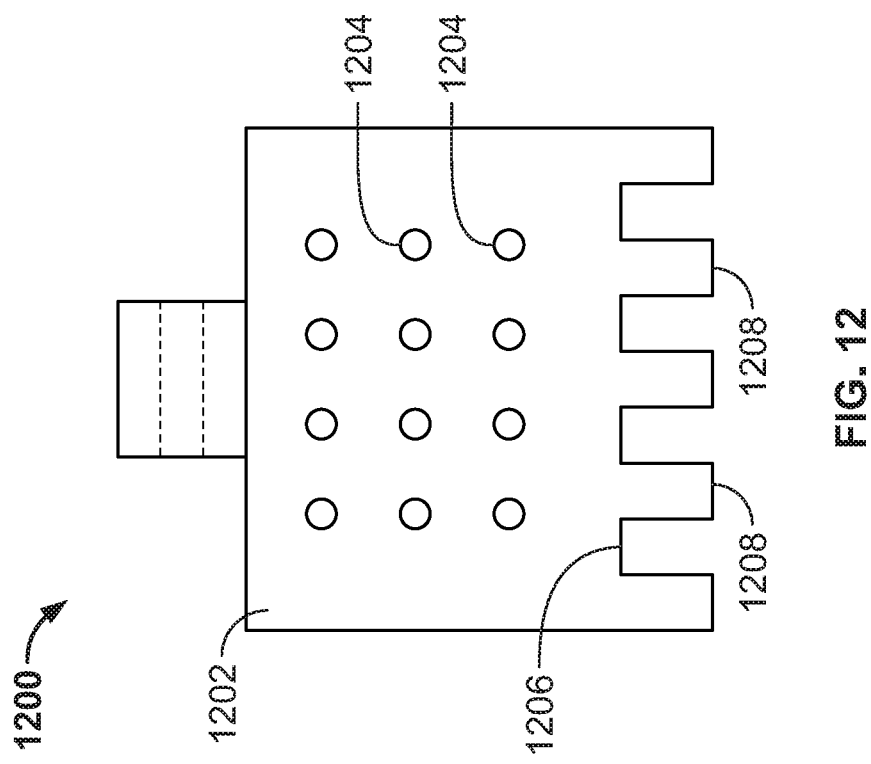
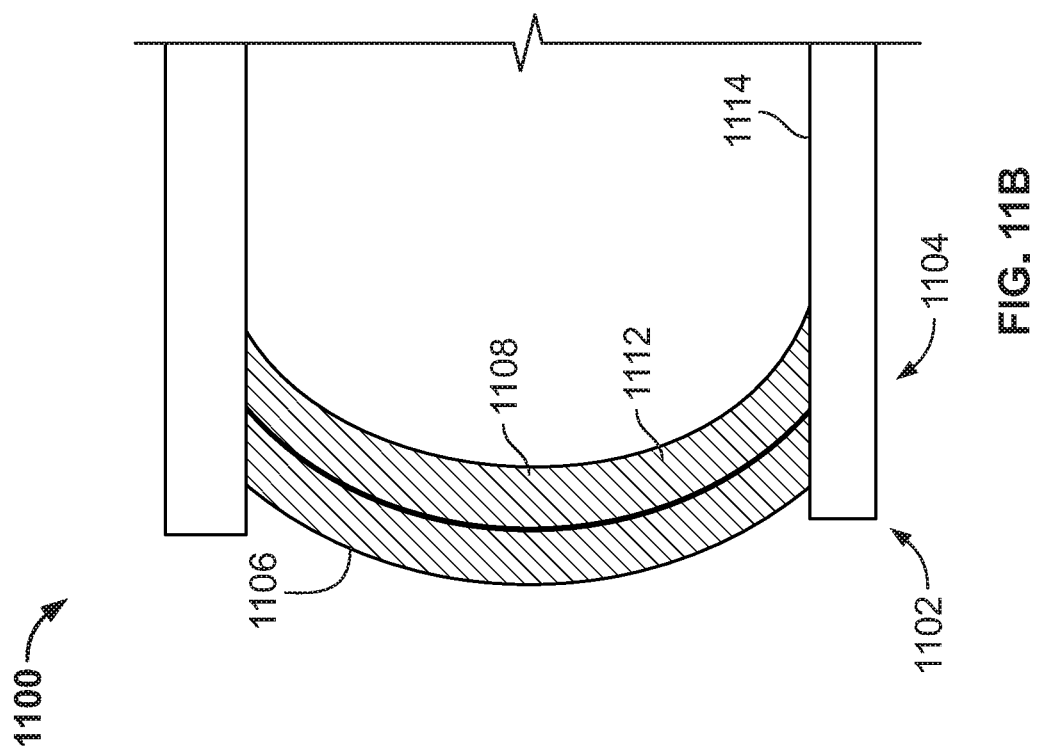

PRESSURE-REDUCTION DEVICES FOR FLUID SYSTEMS

FIELD OF THE DISCLOSURE

This patent relates generally to pressure regulators and, more particularly, to pressure-reduction devices for fluid systems.

BACKGROUND

Fluid valves are commonly used throughout process control and/or fluid distribution systems to control flow rates and/or pressures of various fluids (e.g., liquids, gases, etc.). In the process control industry, many control valve applications, such as power generation or petroleum refining applications, result in process conditions that produce unacceptable levels of aerodynamic noise. For example, a generally acceptable level of aerodynamic noise is approximately 85 dBA measured 1 meter downstream and spaced 1 meter from a pipeline containing a control valve.

SUMMARY

In one example, an example device includes a housing defining an axial fluid passageway between an inlet and an outlet. A first plate is fixed to the housing and positioned in the axial fluid passageway. A second plate is positioned adjacent the first plate in the axial fluid passageway. The second plate is moveable relative to the first plate between a first position to move the pressure-reducing device to a closed position to restrict or prevent fluid flow through the axial fluid passageway and a second position to move the pressure-reducing device to an open position to allow fluid flow through the axial fluid passageway.

In another example, a device includes a body defining a fluid passageway between an inlet and an outlet. A plurality of pressure reducers is positioned along a longitudinal length of the fluid passageway. The pressure reducers are configurable between open positions to allow fluid flow through the passageway and closed positions to prevent fluid flow through the fluid passageway, the pressure reducers to provide a multi-stage, pressure reducing system when fluid flows through the fluid passageway between the inlet and the outlet.

In another example, a device includes means for providing an axial fluid flow passageway, first means for reducing pressure disposed at a first location in the fluid passageway; second means for reducing pressure disposed at a second location in the fluid passageway that is spaced apart from the first location; and means for actuating the first means for reducing pressure and the second means for reducing pressure between an open position to allow fluid flow across the first means for reducing pressure and the second means for reducing pressure, and a closed position to prevent fluid flow across the first means for reducing pressure and the second means for reducing pressure. The first means for reducing pressure to cause a first pressure drop of fluid flowing across the first means for reducing pressure and the second means for reducing pressure to cause a second pressure drop of the fluid flowing across the second means for reducing pressure.

BRIEF DESCRIPTION OF THE DRAWINGS

FIG. 10 is a cross-sectional side view of another example pressure-reduction device disclosed herein.

FIG. 11B is a top view of the example press-reduction device of FIG. 11A.

FIG. 12 is a front view of an example plate that can implement the pressure-reduction devices of FIGS. 1-10.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
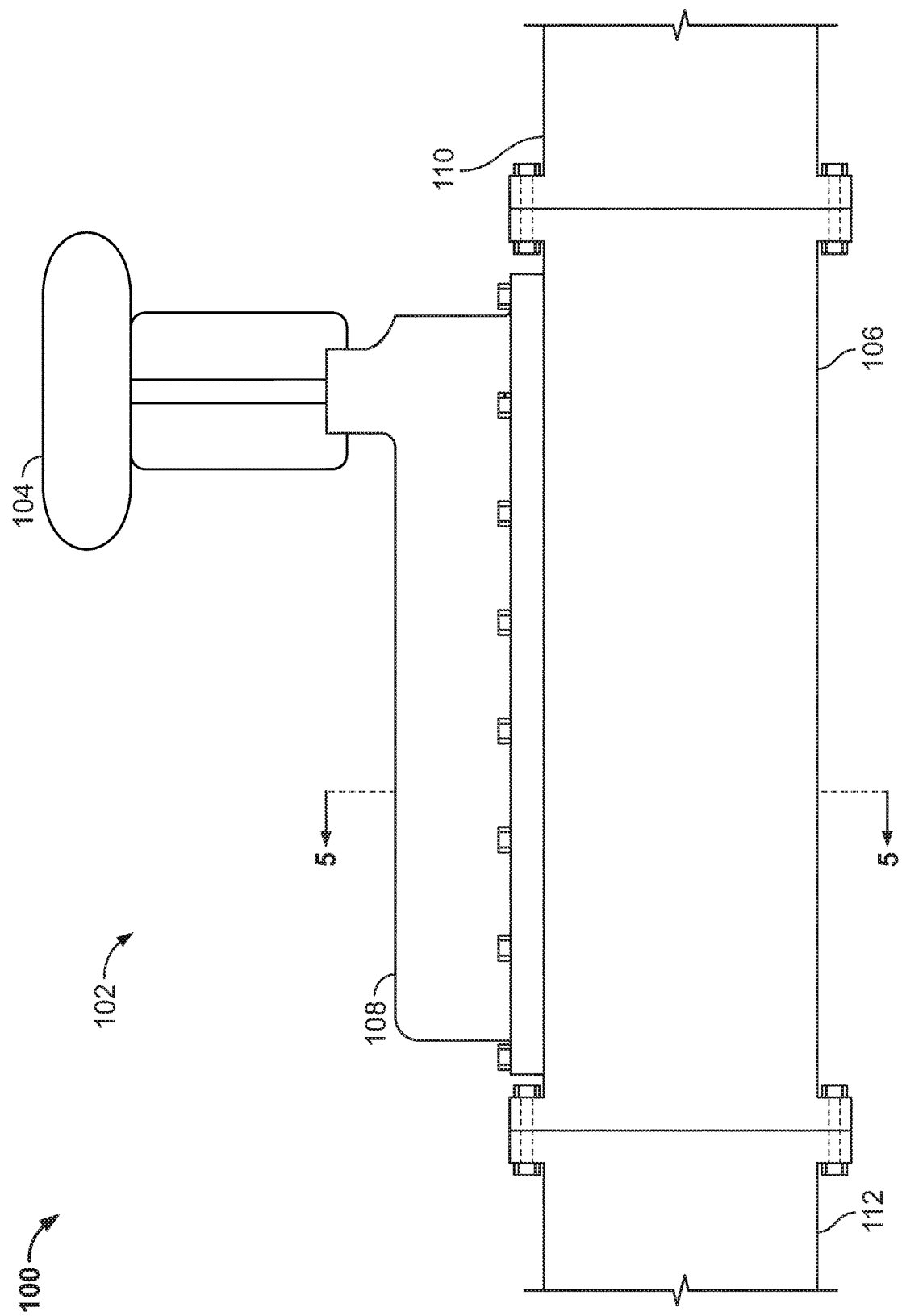
FIG. 1 is a side view of an example fluid system having example pressure-reduction device constructed in accordance with the teachings of this disclosure.

Known fluid control devices (e.g., fluid valves and/or pressure regulators) of fluid distribution systems receive fluid (e.g., vapor, gas, liquid) having a relatively high and somewhat variable pressure from an upstream source and regulate the fluid flow to reduce and/or stabilize the pressure to a level suitable for use by downstream equipment (e.g., equipment of a power generator, a petroleum refinery, etc.). In some instances, fluid devices produce a substantial decrease in pressure or flow rate of the fluid which, in turn, can create a significant amount of audible noise (e.g., greater than about 85 decibels). Some fluid control devices employ a cage to reduce noise and/or cavitation due to a pressure drop across the fluid control device. However, in some instances, a relatively large actuator may be needed to actuate the fluid control devices under high pressure conditions.

Example fluid pressure-reduction devices disclosed herein can be used to reduce energy, pressure, cavitation and/or noise associated with process fluids. Example fluid pressure-reduction devices disclosed herein provide one or more pressure reducers positioned in a fluid passageway. Example pressure reducers disclosed herein provide a multistage, pressure reduction system that reduces a pressure of a process fluid across different stages or portions of a fluid passageway. Example pressure reducers disclosed herein include one or more spaced-apart plates and/or discs (e.g., along a central axis of a fluid passageway) that incrementally reduce pressure (e.g., by a discrete amount) along a flow path of the fluid device. In operation, the pressure drops induced by the plates result in a corresponding reduction or attenuation in noise (e.g., by a discrete decibel level, by a percentage of the decibel level) and/or improved cavitation performance. Example pressure-reduction devices disclosed herein reduce unacceptable high noise levels (e.g., greater than about 85 decibels) that may otherwise be produced via conventional fluid devices (e.g., pressure regulators) to more acceptable low noise levels (e.g., less than about 85 decibels). For example, the pressure-reduction devices disclosed herein can reduce noise levels about 25 decibels.

In some examples, each of the pressure reducers includes a fixed plate (e.g., a first plate) and a movable plate (e.g., a second plate). Specifically, the fixed plate is fixed relative to the movable plate and the movable plate is movable relative to the fixed plate. In this manner, the moveable plate moves relative to the fixed plate to control (e.g., vary, increase, decrease, etc.) fluid flow through the fluid passageway of the pressure-reduction device. For example, to control fluid flow through the pressure-reduction device, the moveable plate moves relative to the fixed plate between a closed position to prevent or restrict fluid flow between the pressure-reduction device and an open position to allow fluid flow through the pressure-reduction device. The fixed plate includes one or more openings or holes (e.g., through holes) and the moveable plate includes one or more openings or holes (e.g., through holes). In the closed position, the holes of the fixed plate are offset (e.g., out of axial alignment) relative to the holes of the moveable plate to prevent or restrict fluid flow through the fixed plate and the moveable plate. In the open position, the holes of the fixed plate align (e.g., axially align) with the holes of the moveable plate to allow fluid flow through the plates. To move the moveable plate relative to the fixed plate, example pressure-reduction devices disclosed herein employ an actuator. In some examples, the actuator is coupled to the moveable plate via a lever. The lever provides a mechanical advantage that reduces an amount of force needed by the actuator to actuate or move the moveable plate relative to the fixed plate, thereby reducing a size of an actuator and/or reducing manufacturing costs. In some examples, the actuator is coupled to the moveable plate via a transmission (e.g., a motor, a gear train, etc.). In some examples, the moveable plate is moved relative to the fixed plate via a motor and/or track system. In some examples, an actuator (e.g., a single actuator) can move a plurality of moveable plates relative to a respective plurality of fixed plates. In some examples, each set of moveable and fixed plates includes a motor or actuator (e.g., a dedicated actuator) to move the movable plates relative to respective the fixed plates. In some examples, the pressure-reduction devices disclosed herein are fluid control valves and/or regulators that employ pressure reducers and/or noise attenuation devices.

FIG. 1 illustrates a cross-sectional side view of a fluid system 100 (e.g., a process control system) that includes a pressure-reduction device 102 constructed in accordance with the teachings of this disclosure. The fluid system 100 can be a high-pressure service system (e.g., between 1000 psi and 5000 psi), a petrochemical process control system, a severe service system, and/or any other suitable process system. Thus, the process fluid can include a liquid, gas or vapor such as, for example, natural gas, steam, a petrochemical, etc.

To control fluid flow through the pressure-reduction device 102, the pressure-reduction device 102 (e.g., a fluid valve) includes an actuator 104. The actuator 104 is coupled to a housing or body 106 (e.g., a valve body) via a bonnet 108. The body 106 (e.g., a pipe) is configured to couple to an upstream source 110 (e.g., a pipeline) and a downstream source 112 (e.g., a pipeline). Via operation of the actuator 104, the pressure-reduction device 102 receives a relatively high pressure process fluid (e.g., between approximately 1000 psi and 5000 psi) from the upstream source 110 (e.g., an upstream pipeline) of the fluid system 100, reduces a pressure of the process fluid (e.g., to between approximately 100 psi and 3000 psi), and provides the reduced pressure process fluid to the downstream source 112 (e.g., a downstream pipeline) of the fluid system 100. Additionally, the pressure-reduction device 102 provides noise attenuation and reduces cavitation. For example, the pressure-reduction device 102 reduces unacceptable noise levels (e.g., greater than 85 decibels) that may otherwise be generated due to a relatively large pressure drop of the fluid and/or relatively high velocity fluid flow rate of the fluid exiting of the pressure-reduction device 102. As a result, the pressure-reduction device 102 reduces the noise levels as the process fluid flows through the pressure-reduction device 102 to a more acceptable noise level and/or reduces cavitation.

Figure 2:
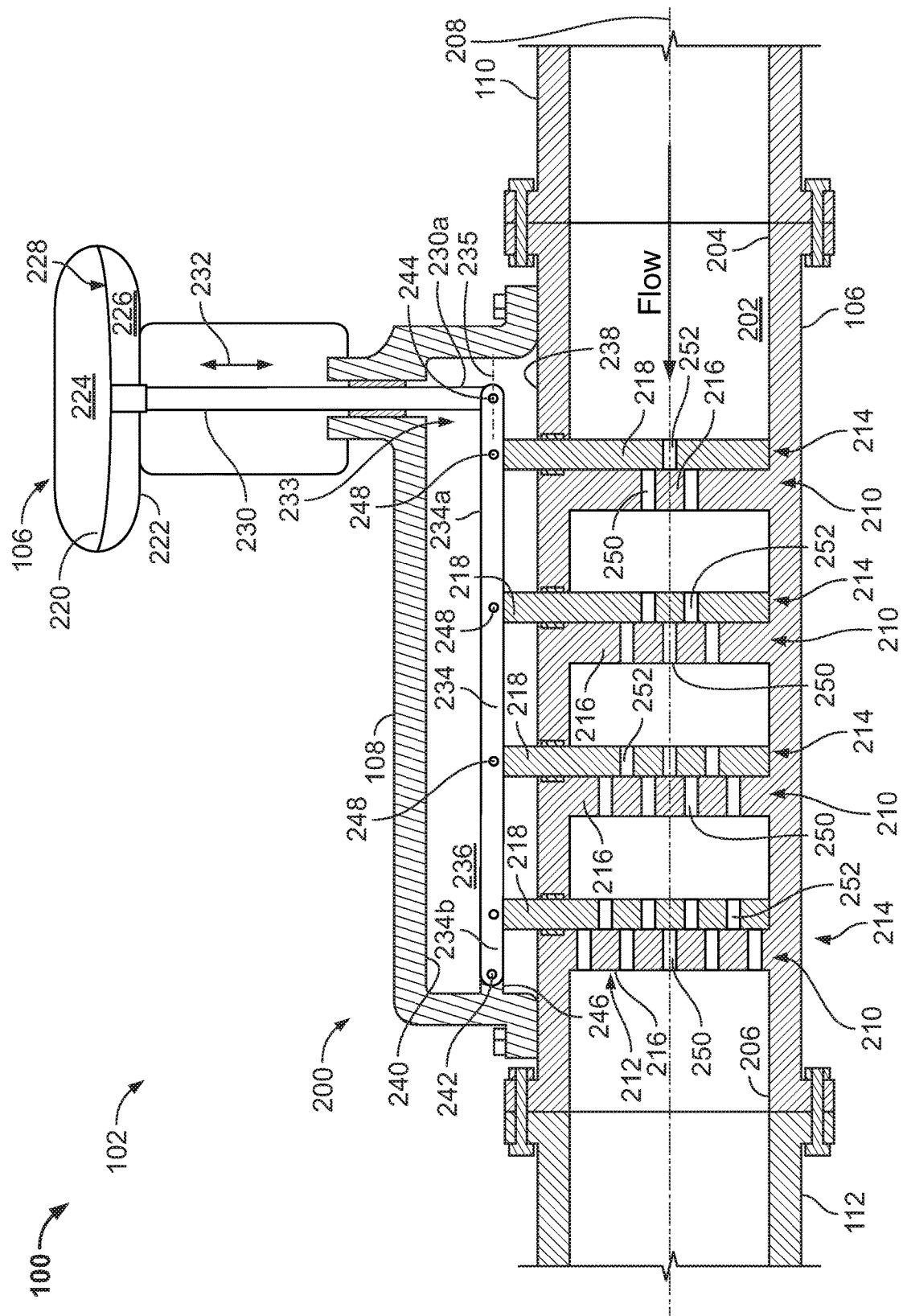
FIG. 2 is a cross-sectional side view of the example pressure-reduction device of FIG. 1.

FIG. 2 is a cross-sectional view of the example pressure-reduction device 102 of FIG. 1. The pressure-reduction device 102 of FIG. 2 is shown in a closed position 200. The body 106 of the pressure-reduction device 102 defines a fluid passageway 202 between an inlet 204 and an outlet 206. The inlet 204 is fluidly coupled to the upstream source 110 and the outlet 206 is fluidly coupled to the downstream source 112. Specifically, the fluid passageway 202 has a linear or axial profile or fluid pathway (e.g., an axial passageway) between the inlet 204 and the outlet 206. In other words, a longitudinal axis 208 of the fluid passageway 202 is linear between or coaxial with the inlet 204 and the outlet 206. For example, the longitudinal axis 208 of the fluid passageway 202 is coaxially aligned with (e.g., a central axis) of the inlet 204 and (e.g., a central axis of) the outlet 206. However, in other examples, the fluid passageway 202 can be non-coaxial relative to the inlet 204 and/or the outlet 206 and/or can be offset relative to the inlet 204 and/or the outlet 206. In some examples, the body 106 provides a means for providing a fluid passageway (e.g., an axial fluid flow passageway).

To reduce a pressure of the process fluid as the fluid flows between the inlet 204 and the outlet 206, the pressure-reduction device 102 includes pressure reducers 210. The pressure reducers 210 (e.g., collectively) provide a multi-stage, pressure reduction system 212 (e.g. a linear pressure reduction system, an equal percentage pressure reduction system, etc.). By reducing the pressure of the fluid across the multi-stage, pressure reduction system 212 provided by the pressure reducers 210, the pressure reducers 210 attenuate noise and reduce cavitation. In some examples, the pressure reducers 210 function as noise attenuation apparatus and/or anti-cavitation devices. In some examples, the pressure reducers 210 provide means for reducing pressure, noise and/or cavitation.

The pressure reducers 210 include a plurality of plate sets 214. Each of the plate sets 214 includes a first plate 216 (e.g., a fixed plate) and a second plate 218 (e.g., a movable plate). The first plates 216 are fixed to the body 106 and positioned in the fluid passageway 202. The second plates 218 are positioned adjacent respective ones of the first plates 216 in the fluid passageway 202. Each second plate 218 is moveable relative to its respective first plate 216. The pressure reducers 210 control fluid flow through the pressure-reduction device 102 by moving the second plates 218 relative to the respective first plates 216. In some examples, the pressure reducers 210 provide means for controlling fluid flow through the fluid passageway 202.

To move the second plates 218 relative to the first plates 216, the pressure-reduction device 102 includes the actuator 104. The actuator 104 of the illustrated example is a pneumatic diaphragm actuator. In other examples, the actuator 104 can be a piston actuator, a bellows actuator, an electric actuator, and/or any other actuator. The actuator 104 includes a diaphragm 220 positioned in an actuator housing 222 to define a first chamber 224 and a second chamber 226. The first chamber 224 and the second chamber 226 receive a control fluid (e.g., pneumatic air) to provide a pressure differential across the diaphragm 220 that causes the diaphragm 220 to move between a first diaphragm position 228 (e.g., a downward position when a pressure in the first chamber 224 is greater than a pressure in the second chamber 226) and a second or upward position (e.g., a second diaphragm position 702 of FIG. 7) when a pressure in the second chamber 226 is greater than a pressure in the first chamber 224. To move the pressure-reduction device 102 to the closed position 200, the diaphragm 220 moves to the first position 228 as shown, for example, in FIG. 2. The diaphragm 220 is coupled to an actuator stem 230 and causes the actuator stem 230 to move in a rectilinear direction 232 (e.g., a vertical direction in the orientation of FIG. 2) when the diaphragm 220 moves between the first diaphragm position 228 and the second position (e.g., the second diaphragm position 702 of FIG. 7).

To couple the actuator stem 230 and the second plates 218, the pressure-reduction device 102 includes a lever 234. The lever 234 is positioned within a cavity 236 of the bonnet 108. For example, the lever 234 is positioned outside of the fluid passageway 202 (e.g., between an upper or outer surface 238 of the body 106 and an inner surface 240 of the bonnet 108 defining the cavity 236 of the bonnet 108). The lever 234 is pivotally coupled to the bonnet 108. For example, a first end 234a of the lever 234 is coupled to the actuator stem 230 and a second end 234b of the lever 234 is pivotally coupled to the bonnet 108 via a lever pivot 242 (e.g., via a pivot pin, a pin, a bushing, etc.). The first end 234a is pivotally coupled to an end 230a of the actuator stem 230 via an actuator pivot 244 (e.g., via a pivot pin, a pin, a bushing, etc.). The bonnet 108 includes a bracket 246 (e.g., a clevis) to pivotally couple the lever 234 to the bonnet 108. In some examples, the lever pivot 242 includes a bushing or bearing to facilitate pivotal motion of the lever 234 relative to the bonnet 108. The lever pivot 242 defines a pivot axis that is non-parallel (e.g., substantially perpendicular) to the longitudinal axis 208 of the fluid passageway 202.

As shown in FIG. 2, when the pressure-reduction device 102 is in the closed position 200, the lever is in a first lever position 233. In the first lever position 233, a longitudinal axis 235 of the lever 234 is parallel relative to the longitudinal axis 208 (e.g., has a zero degree angle relative to horizontal). To move the second plates 218 relative to the first plates 216 via the lever 234, the second plates 218 are coupled to the lever 234. In the illustrated example, the second plates 218 are pivotally coupled to the lever 234 about respective plate pivots 248. In this manner, the second plates 218 can pivot about respective plate pivots 248 to enable the respective ones of the second plates 218 to move in the rectilinear direction 232 (e.g., a vertical direction in the orientation of FIG. 2) and/or relative to the first plates 216 when the lever 234 pivots about the lever pivot 242. In the illustrated example, the second plates 218 move parallel relative to the actuator stem 230 and/or perpendicular relative to the longitudinal axis 208 or a flow direction of the process fluid. In some examples, each of the second plates 218 includes or is operated by a dedicated drive system (e.g., a motor with a rack and pinion system). The plate pivots 248 are spaced relative to each other and spaced from the lever pivot 242.

To control (e.g., allow and prevent or restrict) the flow of fluid through the fluid passageway 202, the first plates 216 include one or more openings 250 (e.g., through holes or openings) and the second plates 218 include one or more openings 252. For example, the actuator 104, via the lever 234, positions one or more of the openings 250 of the first plates 216 into alignment (e.g., coaxial alignment) with the one or more of the openings 252 of the second plates 218 to allow the process fluid to flow through or past the pressure reducers 210. The actuator 104 via the lever 234 positions the openings 250 of the respective first plates 216 out of alignment with the openings 252 of the respective second plates 218 to prevent or restrict fluid flow through the fluid passageway 202.

Figure 3:
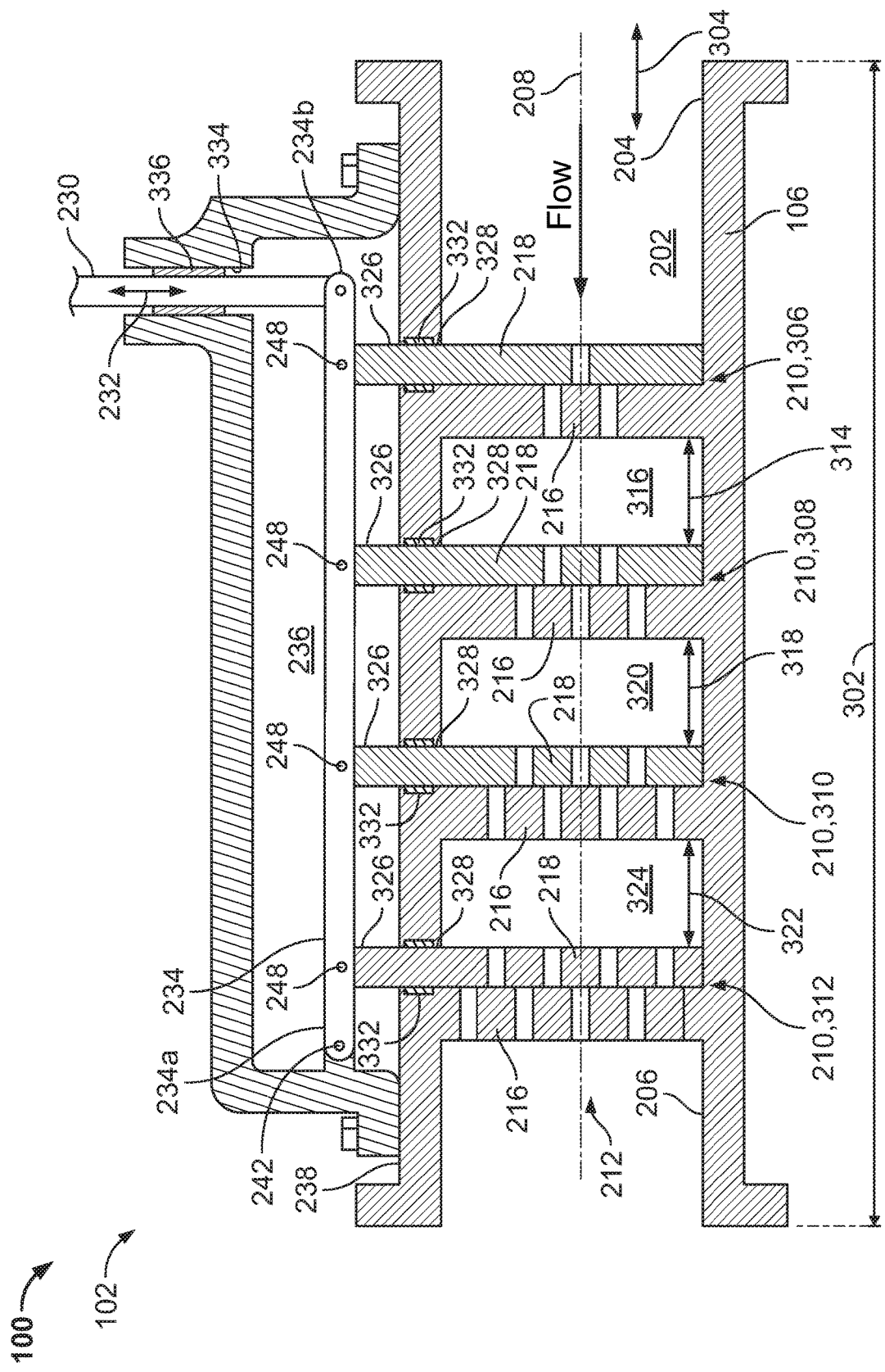
FIG. 3 is a partial, cross-sectional view of the example pressure-reduction device of FIGS. 1-2.

FIG. 3 is a partial, cross-sectional view of the pressure-reduction device 102 of FIG. 2. The pressure reducers 210 are located in the fluid passageway 202 between the inlet 204 and the outlet 206. In this example, the pressure reducers 210 reduce a pressure of the process fluid in multiple stages as the process fluid flows through the pressure-reduction device 102. For example, the pressure reducers 210 are spaced along a length 302 of the fluid passageway 202 in a longitudinal direction 304 (e.g., non-parallel or perpendicular to the rectilinear direction 232) along the longitudinal axis 208. To provide the multi-stage, pressure reduction system 212, the pressure-reduction device 102 of the illustrated example includes a first pressure reducer 306, a second pressure reducer 308, a third pressure reducer 310, and a fourth pressure reducer 312 positioned in the fluid passageway 202. For example, each of the pressure reducers 306-312 provide a pressure-reduction stage of the multi-stage, pressure reduction system 212. For example, each of the pressure reducers 306-312 can reduce a pressure of the process fluid between 100 psi and 400 psi (e.g., per pressure-reduction stage).

The first pressure reducer 306 is spaced a first distance 314 from the second pressure reducer 308 to define a first fluid chamber 316. The second pressure reducer 308 is spaced a second distance 318 from the third pressure reducer 310 to define a second fluid chamber 320. The third pressure reducer 310 is spaced a third distance 322 from the fourth pressure reducer 312 to define a third fluid chamber 324. In the illustrated example, the first distance 314, the second distance 318 and the third distance 322 are equal. In other examples, the first distance 314 can be different (e.g., greater than or less than) the second distance 318 and/or the third distance 322, the second distance 318 can be different (e.g. greater than or less than) the first distance 314 and/or the third distance 322, and/or the third distance 322 can be different (e.g., greater than or less than) the first distance 314 and/or the second distance 318. In some examples, a pressure-reduction device can include more than four pressure reducers or less than four pressure reducers. For example, a pressure-reduction device can include a single pressure reducer, two pressure reducers, five pressure reducers, etc.

The first plates 216 of the pressure reducers 210 are fixed to the body 106 of the pressure-reduction device 102. For example, the first plates 216 are integrally formed with the body 106. However, in some examples, the first plates 216 can be fastened or fixed to the body 106 via fasteners, welds, brackets, etc.

Respective ends 326 of the second plates 218 are coupled to the lever 234 between the first end 234a of the lever 234 and the second end 234b of the lever 234. To couple to the lever 234, the respective ends 326 of the second plates 218 extend or protrude through respective openings 328 (e.g., slots) formed through the outer surface 238 (e.g., an upper surface) of the body 106 to couple to the lever 234. The plate pivots 248 enable the second plates 218 to move (e.g., slide) in the rectilinear direction 232 (e.g., a rectilinear motion, a vertical direction, etc.) through the respective openings 328 of the body 106 when the actuator 104 (FIG. 1) moves the second plates 218 relative to the respective first plates 216 via the lever 234. The openings 328 include seals 332 (e.g., packing, O-rings, etc.) to prevent process fluid from leaking through the openings 328 and into the cavity 236. Additionally, the bonnet 108 includes an opening 334 to receive (e.g., slidably receive) the actuator stem 230. A packing 336 to prevent process fluid leakage to the environment via the actuator shaft 230.

Figure 4:
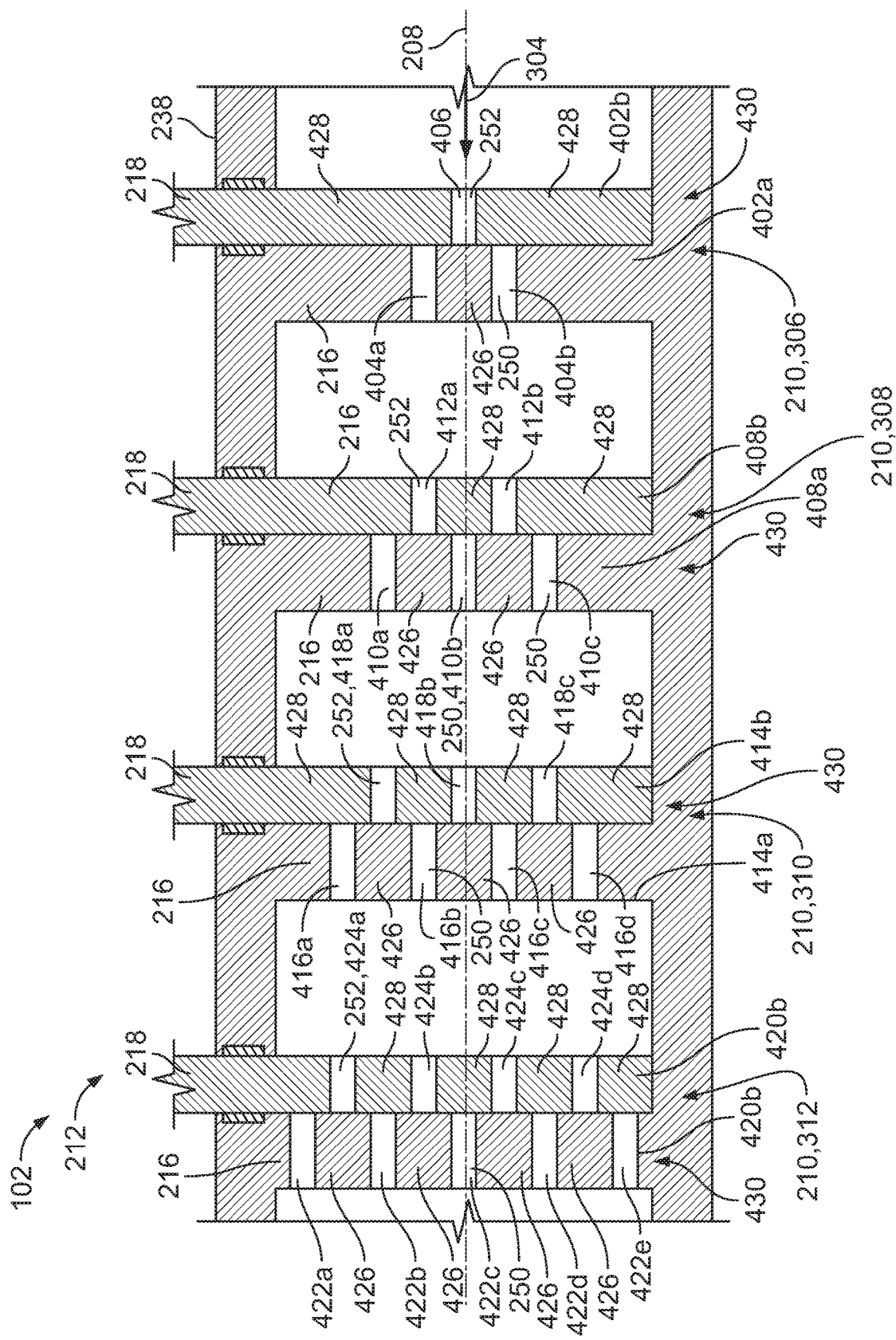
FIG. 4 is an enlarged view of the example pressure-reduction device of FIG. 3.

FIG. 4 is another partial, enlarged view of the pressure-reduction device 102 of FIG. 3. Each of the first plates 216 has a different number of openings 250. Likewise, each of the second plates 218 has a different number of openings 252. For example, a first plate 402a of the first pressure reducer 306 has rows 404a-b (e.g., two rows) of the openings 250 and a second plate 402b of the first pressure reducer 306 has a row 406 (e.g., a single row) of the openings 252. A first plate 408a of the second pressure reducer 308 has rows 410a-c (e.g., three rows) of the openings 250 and a second plate 408b of the second pressure reducer 308 has rows 412a-b (e.g., two rows) of the openings 252. A first plate 414a of the third pressure reducer 310 has rows 416a-d (e.g., four rows) of the openings 250 and a second plate 414b of the third pressure reducer 310 has rows 418a-c (e.g., three rows) of the openings 252. The openings 250 of a first plate 420a of the fourth pressure reducer 312 are arranged in rows 422a-f (e.g., six rows) and the openings 252 of a second plate 420b of the fourth pressure reducer 312 are arranged in rows 424a-e (e.g., five rows). In some examples, each of the first plates 216 and the second plates 218 can have the same number of respective openings 250, 252. The rows 404a-b, 406, 410a-c, 412a-b, 416a-d, 418a-c, 422a-f and 424a-e extend across the respective first and second plates 216, 218 in a direction perpendicular relative to the fluid flow direction and/or the longitudinal axis 208. In some examples, each of the rows 404a-b, 406, 410a-c, 412a-b, 416a-d, 418a-c, 422a-f and 424a-e includes a plurality of respective openings 250, 252. In some examples, each of the rows 404a-b, 406, 410a-c, 412a-b, 416a-d, 418a-c, 422a-f and 424a-e includes a single one of the respective openings 250, 252.

The openings 250 and the openings 252 of the illustrated example have a circular cross-sectional shape (e.g. a diameter). However, in some examples, each of the openings 250, 252 can be oblong, oval, parallel-piped, diamond-shaped, formed as slot-like shapes such as, etc. Additionally, each of the openings 250, 252 has a straight profile in the longitudinal direction 304 between inlets of the respective openings 250 and outlets of the respective openings 252. For example, each of the openings 250 and 252 has a central axis that is parallel relative to the longitudinal axis 208. Additionally, each of the openings 250, 252 has a straight flow path profile in the longitudinal direction 304 (e.g., between an inlet and an outlet of the respective ones of the openings 250, 252). In some examples, the openings 250, 252 can have a tapered or nozzle shaped profile in the longitudinal direction 304. In some examples, the openings 250 and/or 252 can be angled such that the central axes are non-parallel relative to the longitudinal axis 208 (e.g., at an angle of between approximately 5 degrees and 60 degrees).

In the closed position 200, the second plates 218 are in first plate positions 430 relative to the respective first plates 216. When the second plates 218 are in the first plate positions 430, the second plates 218 are coaxially aligned with the respective first plates 216. In other words, central axes of the respective first and second plates 216, 218 are parallel (e.g., coaxially aligned) with the longitudinal axis 208. To prevent or restrict fluid flow through the fluid passageway 202, the openings 250 of the first plates 216 are offset relative to the openings 252 of the respective second plates 218 when the second plates 218 are in the first plate positions 430. The openings 250 do not align (e.g., axially align) with the openings 252 to prevent or restrict fluid flow between the first plates 216 and the second plates 218 when the second plates 218 are in the first plate positions 430. To this end, the openings 250 of the first plates 216 are not in fluid communication with the openings 252 of the second plates 216. Thus, fluid is prevented from flowing through the pressure reducers 210.

For example, solid surfaces 426 (e.g., a solid, non-porous surface) of the first plates 216 obstruct the openings 252 of the respective second plates 218 and solid surfaces 428 (e.g., a solid, non-porous surface) of the second plates 218 obstruct the openings 250 of the respective first plates 216 to prevent fluid flow across the respective ones of the pressure reducers 210. The solid surfaces 426, 428 are perpendicular to the longitudinal axis 208. In some examples, the solid surfaces 426 of each of the first plates 216 that are oriented toward the respective second plates 218 and/or the solid surfaces 428 of each of the second plates 218 that are oriented toward the first plates 216 can include seals to seal between respective ones of the first and second plates 216, 218 of the respective plate sets 214. For example, the seals can include a coating, a film or material composed of for example, rubber, polyvinyl fluoride (e.g., Teflon) and/or any other suitable material(s).

Figure 5:
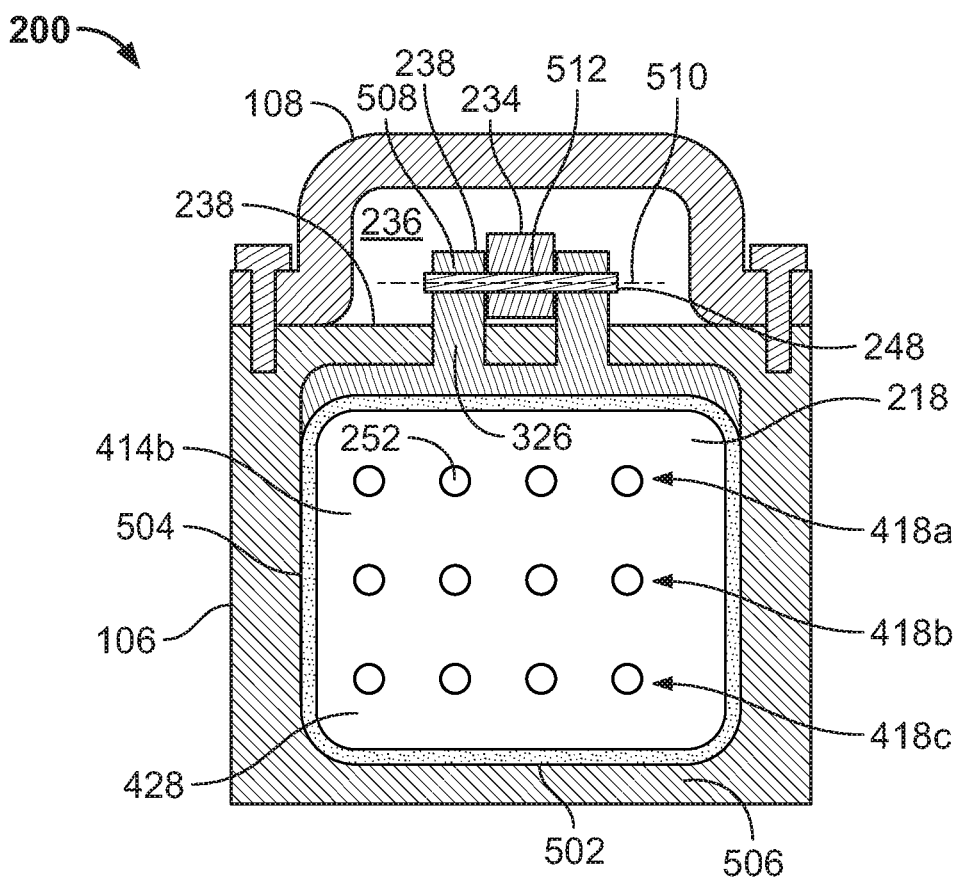
FIG. 5 is a cross-sectional view of the example pressure-reduction device taken along line 5-5 of FIG. 1.

FIG. 5 is front view of the pressure-reduction device 102 taken along line 5-5 of FIG. 3. The fluid passageway 202 defined by the body 106 has a rectangular or square cross-sectional shape. However, in other examples, the fluid passageway 202 can include a circular cross-sectional shape and/or any other cross-sectional shape. Additionally, the outer surface 238 of the body 106 has a flat or non-rounded profile to receive the bonnet 108.

To prevent or restrict fluid from leaking through an outer edge 504 of the second plate 414b, the second plate 414b includes a seal 502. For example, the second plate 414b of the illustrated example includes the seal 502 (e.g., a rubber seal, a coating, etc.) around the outer edge 504 (e.g., a partial perimeter edge) of the second plate 414b that engages a wall 506 of the fluid passageway 202 when the second plate 414b is in the first plate position 430. The first plates 402a, 408a, 414a, 418b and the second plates 402b, 408b, and 418b of FIG. 4 include the seal 502. The openings 252 of the second plate 414b are arranged in the rows 418a-418c between the outer edge 504 of the second plate 414b. For example, the openings 252 are aligned vertically and/or horizontally in the orientation of FIG. 5. However, in some examples, the openings 252 can be arranged in any pattern and/or may be randomly positioned on the solid surface 428. The end 326 of the second plate 414b includes a clevis 508 to receive the lever 234. The clevis 508 enables the second plate 414b to pivot relative to the lever 234 via a pivot axis 510 of the plate pivot 248. A pin 512 passes through the lever 234 and the clevis 508 to pivotally couple the end 326 of the second plate 414b to the lever 234 and define the pivot axis 510. The first plates 402a, 408a, 414a, and 418a and/or the second plates 402b, 408b, and 418b can be arranged or formed similar to the example second plate 414b of FIG. 5 (e.g., except for the number of respective openings 250, 252).

Figure 6:
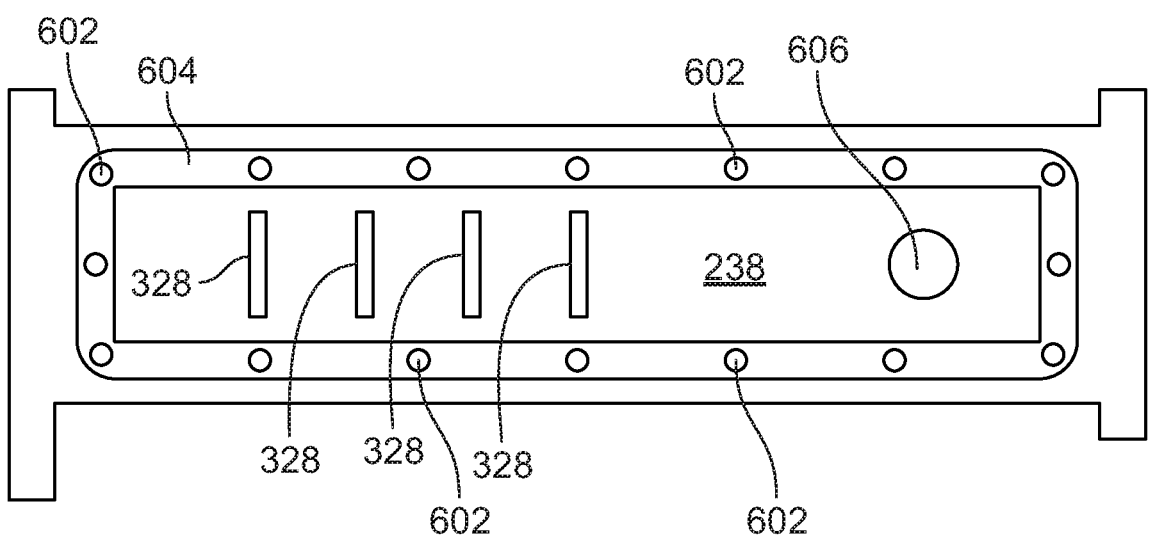
FIG. 6 is a top view of the example pressure-reduction device of FIGS. 1-5.

FIG. 6 is a top view of the body 106 of the example pressure-reduction device 102 (e.g., shown without the bonnet 108). The outer surface 238 of the body 106 has a perimeter that includes a plurality of apertures 602 to receive fasteners of the bonnet 108. The upper surface 238 has a seal 604 (e.g., a gasket) to provide a seal between the bonnet 108 and the body 106. For example, the outer surface 238 and/or a seal 604 has a rectangular shape. The upper surface 238 has an opening 606 to receive the actuator stem 230 (FIG. 2) and the openings 328 (e.g., slots) to receive the respective ends 326 (FIG. 3) of the second plates 218 (FIG. 3).

Figure 7:
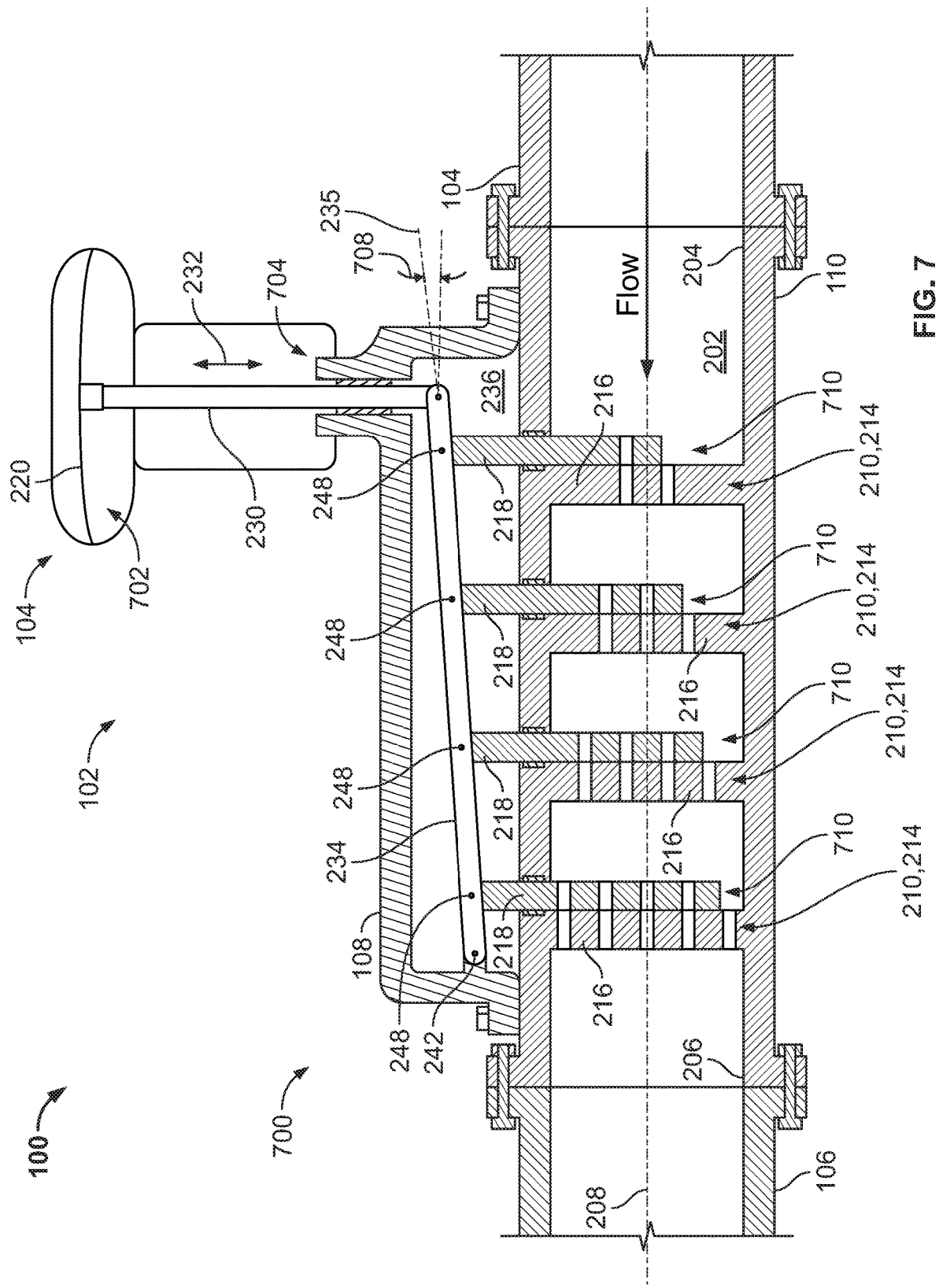
FIG. 7 is a cross-sectional side view of the example pressure-reduction device of FIG. 1 shown in an example open position.

FIG. 7 is a cross-sectional view of the fluid system 100 and the pressure-reduction device 102 shown in an open position 700. In the open position 700, the process fluid flows through the passageway 202 from the inlet 204 to the outlet 206. To move the pressure-reduction device 102 to the open position 700, the diaphragm 220 moves to a second position 702 as shown, for example, in FIG. 7. The diaphragm 220 causes the actuator stem 230 to move in the rectilinear direction 232 (e.g., a vertical direction away from the body 106 in the orientation of FIG. 7) when the diaphragm 220 moves to the second diaphragm position 702. As shown in FIG. 7, when the pressure-reduction device 102 is in the open position 700, the lever 234 is in a second lever position 704. In the second lever position 704, the longitudinal axis 235 of the lever 234 is non-parallel relative to the longitudinal axis 208. For example, the longitudinal axis 235 of the lever 234 is at an angle 708 relative to horizontal that is between about 1 degree and 10 degrees (e.g., 3 degrees). Because of the mechanical advantage provided by the lever 234, the actuator 104 does not have to move the lever 234 a large distance (e.g., a vertical distance) to move the pressure-reduction device 102 between the closed position 200 of FIG. 2 and the open position 700 of FIG. 7.

As shown in FIG. 7, when the lever 234 is in the second lever position 704, the second plates 218 are in second plate positions 710 relative to the respective first plates 216 to allow process fluid to flow through the pressure reducers 210. Thus, movement of the lever 234, via the actuator 104, between the first lever position 233 and the second lever position 704 causes the second plates 218 to move between the first plate positions 430 and the second plate positions 710. In this example, the second plates 218 move relative to the respective first plates 216 simultaneously via the lever 234. Thus, the pressure reducers 210 are configurable between open positions to allow fluid flow through the fluid passageway 202 and closed positions to prevent fluid flow through the fluid passageway 202. Rectilinear movement of the actuator stem 230 causes the lever 234 to pivot about the lever pivot 242 between a first lever position 233 and the second lever position 704. In some examples, the pressure reducers 210 provide means for reducing pressure. In some examples, the lever 234 provides means for moving the means for reducing pressure simultaneously between the open position and the closed position.

Figure 8:
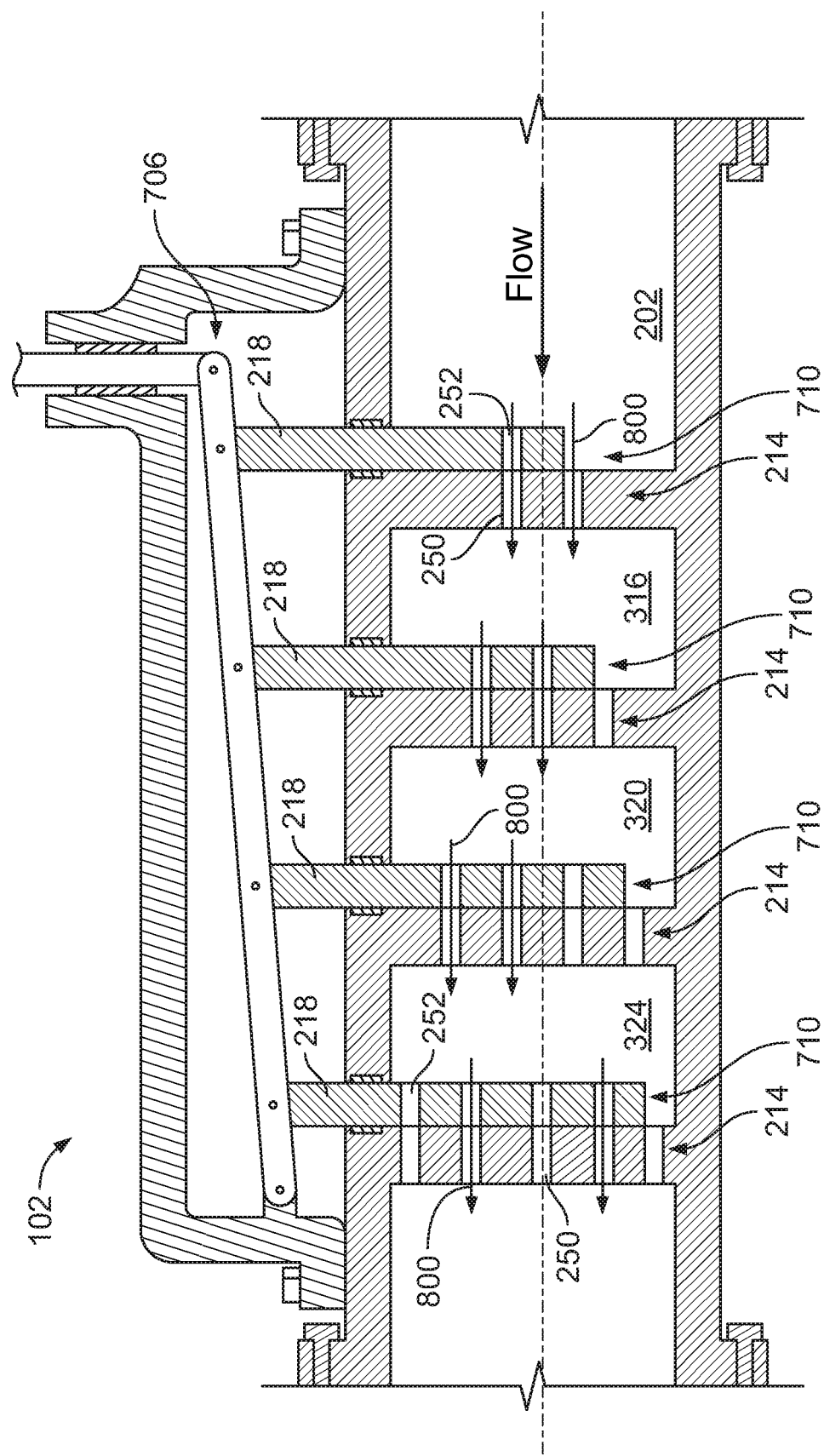
FIG. 8 is an enlarged view of the example pressure-reduction device of FIG. 7.

FIG. 8 is an enlarged view of the pressure-reduction device 102 of FIG. 7. As shown in FIG. 8, when the second plates 218 are in the second plate positions 710, one or more of the openings 252 of the second plates 218 at least partially align with one or more of the openings 250 of the respective first plates 216 to provide (e.g., form) fluid passages 800 to enable the process fluid to flow through the plate sets 214. In this example, the openings 252 of the second plates 218 are coaxially aligned with the openings 250 of the respective first plates 216 when the second plates 218 are in the second plate positions 710.

Figure 9:
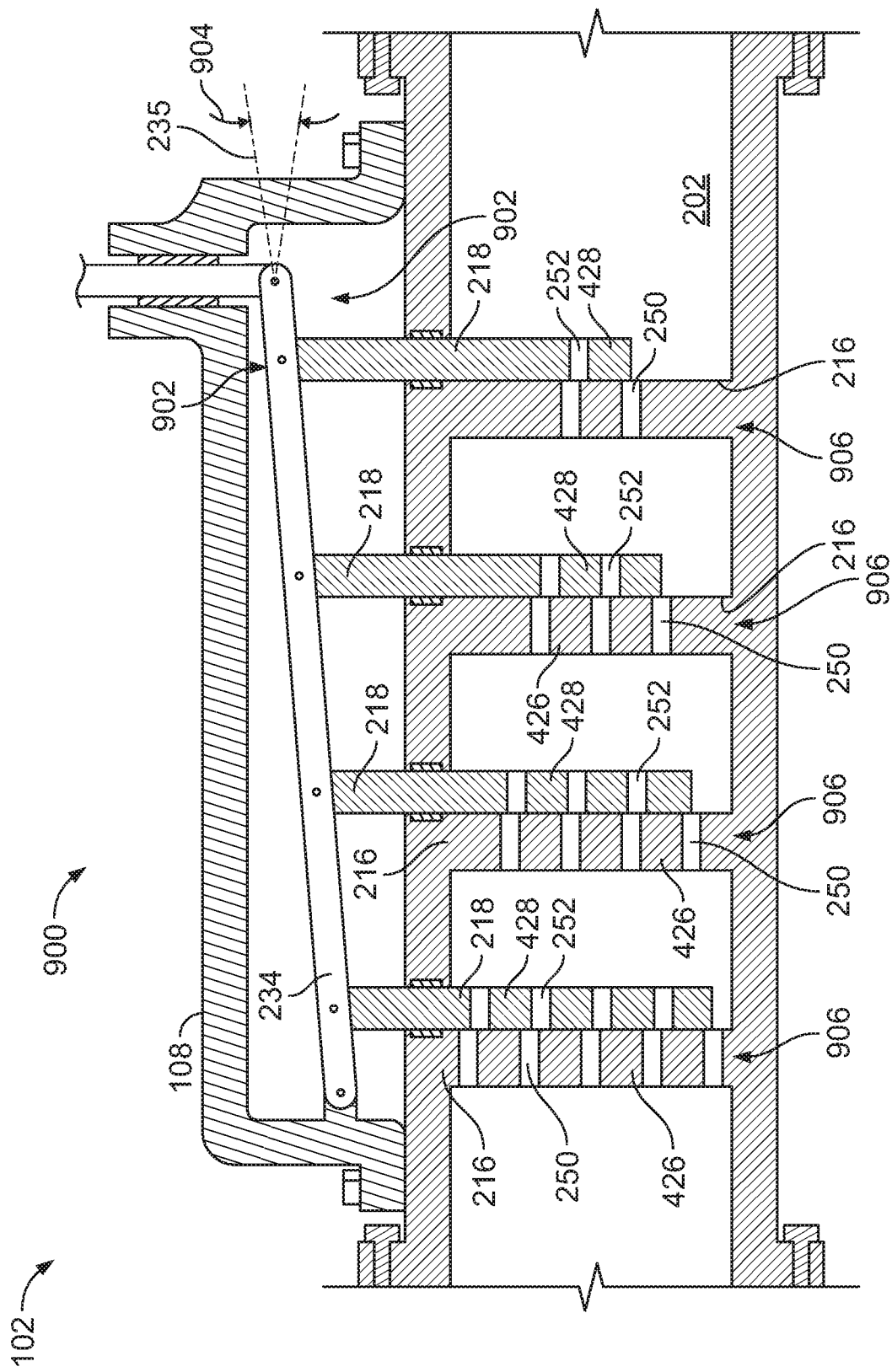
FIG. 9 is a cross-sectional view of the example pressure-reduction device of FIGS. 1-9 shown in an example intermediate position.

FIG. 9 is a partial, cross-sectional view of the pressure-reduction device 102 shown in an intermediate position 900 between the closed position 200 (e.g., a fully closed position) and the open position 700 (e.g., a fully open position) to vary (e.g., increase or decrease) fluid flow through the fluid passageway 202. To move the pressure-reduction device 102 to the intermediate position, a pressure differential across the diaphragm 220 can be controlled to position the lever 234 at an intermediate lever position 902 between the first lever position 233 and the second lever position 706. At the intermediate lever position 902, an angle 904 between the longitudinal axis 235 of the lever 234 and horizontal is smaller than the angle 708 of the lever 234 relative to horizontal when the lever 234 is in the second lever position 704 as shown in FIG. 7.

In the intermediate position 900, the second plates 218 are positioned to intermediate plate positions 906 (e.g., between the first plate positions 430 and the second plate positions 710). In turn, the openings 252 of the second plates 218 can be configured to be in fluid communication with, but not coaxially aligned with, the openings 250 of the respective first plates 216 when the second plates 218 are in the second plate positions 710. In other words, the openings 252 of the second plates 218 are offset or not coaxially aligned with the openings 250 of the respective first plates 216 when the second plates 218 are in an intermediate position between the first plate positions 430 and the second plate positions 710 to control fluid flow through the fluid passageway 202. For example, the openings 250 of the first plates 216 are partially blocked or obstructed by (e.g., covered by) the solid surface 428 of the respective second plates 218 and the openings 252 of the second plates 218 are partially blocked or obstructed by (e.g., covered by) the solid surfaces 426 of the respective first plates 416. As a result, a size (e.g., a cross-sectional area) of the fluid passages 800 are reduced (e.g., provide smaller cross-sectional area) when the pressure-reduction device 102 is in an intermediate position compared to a size (e.g., a cross-sectional flow area) of the fluid passages 800 when the pressure-reduction device 102 is in the open position 700.

In operation, referring to FIGS. 1-9, to move the pressure-reduction device 102 to the closed position 200 to prevent fluid flow through the fluid passageway 202, a control fluid (e.g., air) is provided in the first chamber 224 of the actuator 104 to move the diaphragm 220 to the first diaphragm position 228 and cause the actuator stem 230 to move toward the body 106 in the rectilinear direction 232. In turn, the actuator stem 230 causes the lever 234 to pivot about the lever pivot 242 to the first lever position 233. As the lever 234 moves to the first lever position 233, the lever 234 causes the second plates 218 to move (e.g., slide) within the openings 328 relative to the first plates 216 in the rectilinear direction 232, to cause the openings 252 of the second plates 218 move out of alignment or fluid communication with the openings 250 of the respective first plates 216. Further, the plate pivots 248 and the actuator pivot 244 enable the second plates 218 and the actuator stem 230, respectively, to move in the rectilinear direction 232 as the lever 234 rotates about the lever pivot 242.

To move the pressure-reduction device 102 to the open position 700 to allow fluid flow through the fluid passageway 202, a control fluid (e.g., air) is provided in the second chamber 226 of the actuator 104 to move the diaphragm 220 to the second diaphragm position 702 and cause the actuator stem 230 to move away from the body 106 in the rectilinear direction 232. In turn, the actuator stem 230 causes the lever 234 to pivot about the lever pivot 242 to the second lever position 704. As the lever 234 moves to the second lever position 704, the lever 234 causes the second plates 218 to move (e.g., slide) within the openings 328 relative to the first plates 216 in the rectilinear direction 232, to cause the openings 252 of the second plates 218 to move into alignment or fluid communication with the openings 250 of the respective first plates 216 to provide the flow through fluid passages 800. The plate pivots 248 and the actuator pivot 244 enable the second plates 218 and the actuator stem 230, respectively, to move in the rectilinear direction 232 as the lever 234 rotates about the lever pivot 242. Additionally, the actuator 104 moves the second plates 218 of the plate sets 214 simultaneously (e.g., between the first and second plate positions 430, 710) via the lever 234.

In the open position 700, the multi-stage, pressure reduction system 212 provides a multi-stage pressure reduction system via the pressure reducers 210 when process fluid flows through the fluid passageway 202 between the inlet 204 and the outlet 206. Additionally, the first plates 216 and the second plates 218 are structured to cause reduction of pressure and provide noise attenuation as fluid flows through the fluid passageway 202. For example, the first pressure reducer 306 provides a first pressure reduction stage, the second pressure reducer 308 provides a second pressure reduction stage, the third pressure reducer 310 provides a third pressure reduction stage, and the fourth pressure reducer 312 provides a fourth pressure reduction stage. Each of the pressure reduction stages 306-312 provided by the respective ones of the pressure reducers 210 can reduce a pressure of the process fluid between 100 psi and 1000 psi. In some examples, each of the pressure reduction stages 306-312 can provide pressure reductions greater than 1000 psi or less than 100 psi. The chambers 316, 320, 324 provided between the respective pressure reducers 210 each provide an energy recovery zone or area to enable recovery of fluid energy or characteristics such as, velocity, etc. For example, to reduce aerodynamic noise, the pressure reducers 210 causes the fluid to flow in multiple, smaller flow streams via the fluid passages 800. In turn, the fluid passages 800 reduce an amount of energy in the fluid flow stream that would otherwise convert to noise. The chambers 316, 320, 324 enable the process fluid to recover energy to provide a substantially uniform velocity through the fluid passageway 202 between the inlet 204 and the outlet 206.

In some examples, one or more of the pressure reducers 210 can be configured to maintain a pressure across the at least one of the pressure reducers 210 and configured to provide a high flow condition or a low flow condition. In other words, the at least one of the pressure reducers 210 does not cause a pressure drop (e.g., an insignificant pressure drop such as, for example, between 0 psi to 10 psi) across the at least one of the pressure reducers 210. For example, the fourth pressure reducer 312 can be configured to provide an insignificant pressure drop (e.g., between 0 psi and 10 psi) as the fluid flows from the third fluid chamber 324 to the outlet 206. However, the fourth pressure reducer 312 can be configured to provide a low flow condition or a high flow condition exiting the fourth pressure reducer 312 based on a profile (e.g., geometry, size, cross-sectional shape, etc.) of the openings 250 of the first plate 420a and/or the openings 252 of the second plate 420b.

The example pressure-reduction device 102 can be manufactured using an additive manufacturing process (e.g., a direct metal laser sintering additive manufacturing process). In some examples, the body 106, the pressure reducers 210, the lever 234 and the bonnet 108 are formed via additive manufacturing. In some examples, the body 106 and the pressure reducers 210 are formed via additive manufacturing and the lever 234 and the bonnet are assembled with the body 106. In some examples, the pressure-reduction device 102 can be formed using other manufacturing processes including, injection molding, machining, investment casting, and/or any other manufacturing process(es). These manufacturing methods allows for the holes in the plates 250 and 252 to be shaped to reduce (e.g., minimize) noise and cavitation by having shapes such as jet nozzles, tapered openings, square shaped openings, and/or any other shape. The example pressure-reduction device 102 can be composed of any material(s) or alloys such as, for example, Inconel, steel, aluminum, plastic, PTFE, Teflon, and/or any other material(s).

FIG. 10 illustrates another example pressure-reduction device 1000 disclosed herein. The pressure-reduction device 1000 of the illustrated example is formed as a cartridge 1002 that can be positioned in a fluid flow passageway 1004 defined by a body 1006 (e.g., a pipe). The cartridge 1002 includes a plurality of pressure reducers 1008 positioned between an upper support plate 1010 and a lower support plate 1012. The pressure reducers 1008 are coupled to a lever 1014 pivotally coupled to the upper support plate 1010. The lever 1014 is coupled to an actuator stem 230 of an actuator (e.g., the actuator 104 of FIG. 1). The body 1006 includes an opening 1016 to receive the actuator stem 230. The lower support plate 1012 attaches to (e.g., via weld, fasteners, etc.) a lower surface 1018 of the body 1006. In this manner, the cartridge 1002 can be formed separately from the body 1006 to facilitate manufacturing. For example, the cartridge 1002 can be formed via additive manufacturing, machining, and/or any other process. The pressure-reduction device 1000 of FIG. 10 operates similar to the pressure-reduction device 102 of FIGS. 1-9. For example, the pressure reducers 1008 operate via the lever 1014 substantially similar to the lever 234 and pressure reducers 210 of FIGS. 1-9.

Figure 11A:
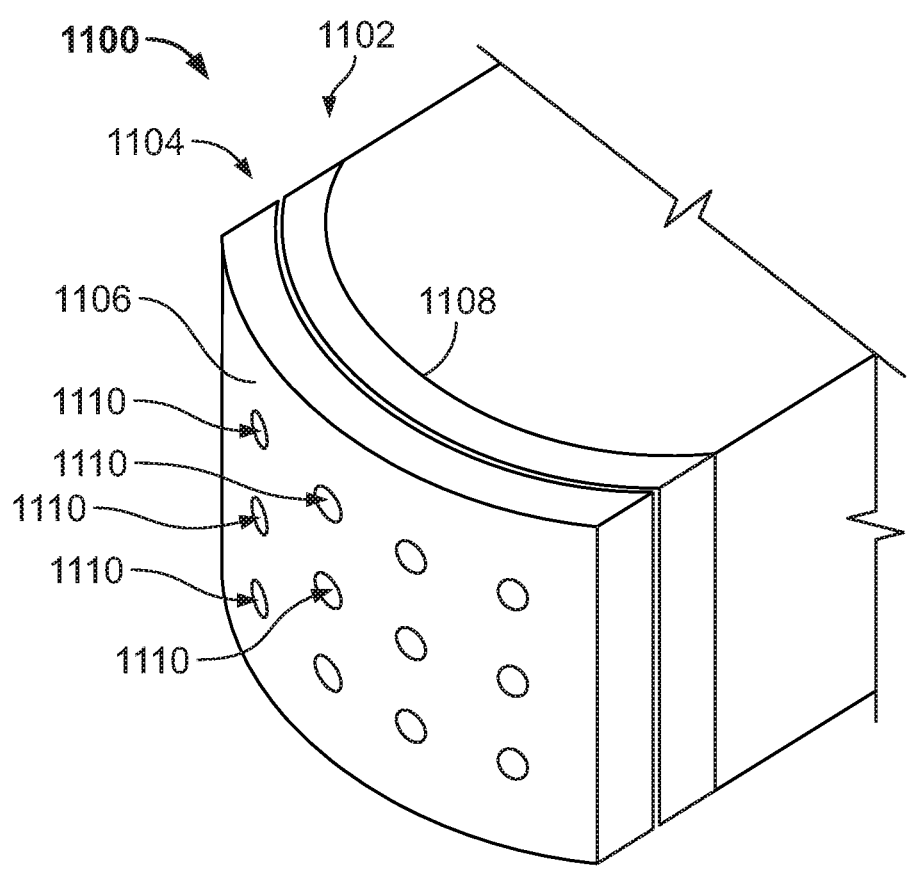
FIG. 11A is a partial, perspective view of another example pressure-reduction device disclosed herein.

FIG. 11A a partial, perspective view of another pressure-reduction device 1100 disclosed herein. FIG. 11B is a side view of FIG. 11A. The pressure-reduction device 1100 includes a pressure reducer 1102. The pressure reducer 1102 can implement the pressure reducers 210 of FIG. 1-9 and/or the pressure reducers 1008 of FIG. 10. The pressure reducer 1102 includes a plate set 1104 that has a first plate 1106 and a second plate 1108 adjacent the first plate 1106. The first plate 1106 and the second plate 1108 have a curved or arcuate profile. The first plate 1106 includes a plurality of openings 1110 and the second plate 1112 has a plurality of openings. In the closed position, the second plate 1108 moves relative to the first plate 1106 via a lever (e.g., the lever 234 and slots or openings in a valve body, curved openings, etc.). For example, the second plate 1108 moves relative to the first plate 1106 between a first position to obstruct the openings 1110 and prevent fluid flow through a fluid passageway 1114 and a second position to at least partially uncover the openings 1110 to allow fluid flow through the fluid passageway 1114. The curved profile enables the first and second plates 1106, 1108 to withstand relatively large forces and inhibit the plate 1200 from bending or deforming due to forces exerted on the first and second plates 1106, 1108 by the pressurized fluid upstream from the first and second plates 1106, 1108.

FIG. 12 is a front view of a plate 1200 disclosed herein. The plate 1200 can implement the first plates 216 and/or the second plates 218 of FIGS. 1-9. The plate 1200 includes a body 1202 having apertures 1204. A lower edge 1206 of the body 1202 includes one or more protrusions 1208 that engage slots or openings in a body (e.g., the body 106, 1006 of FIGS. 1-10) when a pressure-reduction device is in a closed position. The protrusions 1208, when engaged with a body of the pressure-reduction device enable the plate 1200 to withstand relatively large pressures and inhibit the plate 1200 from bending or deforming due to a force exerted on the plate 1200 by the pressurized fluid upstream from the plate 1200. For example, one or more of the first plates 216 and/or the second plates 218 of FIGS. 1-9 can include the protrusions 1208.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A pressure-reduction device comprising:
   a housing defining an axial fluid passageway between an inlet and an outlet;
   a first plate fixed to the housing and positioned in the axial fluid passageway;
   a second plate positioned adjacent the first plate in the axial fluid passageway;
   a third plate fixed to the housing and positioned in the axial fluid passageway spaced from the first plate and the second plate; and
   a fourth plate positioned adjacent the third plate in the axial fluid passageway, the second plate moveable relative to the first plate and the fourth plate moveable relative to the third plate between respective first positions to move the pressure-reducing device to a closed position to restrict or prevent fluid flow through the axial fluid passageway and second positions to move the pressure-reducing device to an open position to allow fluid flow through the axial fluid passageway.

2. The device of claim 1, wherein the first plate and the third plate are integrally formed with the housing.

3. The device of claim 1, wherein the first plate is coaxially aligned with the second plate and the third plate is coaxially aligned with the fourth plate when the second plate and the fourth plate are in the respective first positions.

4. The device of claim 1, wherein the first plate includes one or more first openings and the second plate includes one or more second openings.

5. The device of claim 4, wherein the one or more first openings at least partially align with respective ones of the one or more second openings to provide a fluid pathway between the first plate and the second plate when the second plate is in the second position.

6. The device of claim 5, wherein the one or more first openings do not align with the respective ones of the one or more second openings to prevent or restrict fluid flow between the first plate and the second plate when the second plate is in the first position.

7. The device of claim 1, further including an actuator to move the second plate relative to the first plate and the fourth plate relative to the third plate between the respective first and the second positions.

8. The device of claim 7, wherein the actuator includes a lever, the lever being pivotally coupled to the housing about a first pivot, pivotally coupled to the second plate about a second pivot spaced from the first pivot, and pivotally coupled to the third plate about a third pivot spaced from the first pivot and the second pivot.

9. The device of claim 8, wherein the actuator includes an actuator stem coupled to the lever, wherein rectilinear movement of the actuator stem causes the lever to pivot about the first pivot between a first lever position and a second lever position, wherein movement of the lever between the first lever position and the second lever position causes the second plate and the fourth plate to move between the respective first and second positions.

10. The device of claim 8, wherein the second plate is coupled to the lever via a first pin and the fourth plate is coupled to the lever via a second pin.

11. The device of claim 10, wherein the second plate and the fourth plate move simultaneously relative to the respective first plate and the third plate.

12. The device of claim 1, wherein the first plate and the second plate are structured to cause reduction of pressure and provide noise attenuation as fluid flows through the axial fluid passageway.

13. The device of claim 1, wherein the third plate includes one or more third openings and the fourth plate includes one or more fourth openings.

14. The device of claim 13, wherein the one or more third openings at least partially align with respective ones of the one or more fourth openings to provide a fluid pathway between the third plate and the fourth plate when the fourth plate is in the second position.

15. The device of claim 14, wherein the one or more third openings do not align with the respective ones of the one or more fourth openings to prevent or restrict fluid flow between the third plate and the fourth plate when the fourth plate is in the first position.

16. A pressure-reduction device comprising:
    a body defining a fluid passageway between an inlet and an outlet;
    a plurality of pressure reducers positioned along a longitudinal length the fluid passageway, the pressure reducers configurable between open positions to allow fluid flow through the passageway and closed positions to prevent fluid flow through the fluid passageway, the pressure reducers to provide a multi-stage, pressure reducing system when fluid flows through the fluid passageway between the inlet and the outlet, the pressure reducers include a plurality of a plate sets, each of the plate sets having a fixed plate and a movable plate; and
    an actuator operatively coupled to the movable plate of each one of the plate sets via a lever, the actuator to move movable plate relative to the fixed plate of each of the plate sets between a first plate position and a second plate position to move the pressure reducers between the open positions and the closed positions.

17. The device of claim 16, wherein the movable plate of each one of the plate sets moves simultaneously via the lever.

18. A pressure-reduction device comprising:
    a body defining a fluid passageway between an inlet and an outlet;
    a plurality of pressure reducers positioned along a longitudinal length the fluid passageway, the pressure reducers configurable between open positions to allow fluid flow through the passageway and closed positions to prevent fluid flow through the fluid passageway, the pressure reducers to provide a multi-stage, pressure reducing system when fluid flows through the fluid passageway between the inlet and the outlet, the pressure reducers include a plurality of a plate sets, each of the plate sets having a fixed plate and a movable plate, each fixed plate includes a plurality of first openings and each movable plate includes a plurality of second openings.

19. The device of claim 18, wherein a solid surface of each movable plate is to cover the first openings of a respective one of the fixed plates and a solid surface of each fixed plate is to cover the second openings of a respective one of the movable plates to prevent fluid flow through the fluid passageway.

20. The device of claim 18, wherein at least portions of the first openings align with at least portions of the second openings to allow fluid flow through the fluid passageway.

* * * * *